United States Patent
Buhrmann et al.

(10) Patent No.: US 6,229,885 B1
(45) Date of Patent: *May 8, 2001

(54) METHOD FOR PROVIDING REMOTE EMULATION OF THE FUNCTIONALITY OF A PRIVATE EXCHANGE

(75) Inventors: Michael Buhrmann, Redmond; Nicolas Kauser, Bellevue, both of WA (US)

(73) Assignee: AT&T Wireless Svcs. Inc., Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,497

(22) Filed: Oct. 10, 1997

(51) Int. Cl.$^7$ ..................................... H04M 3/42
(52) U.S. Cl. .......................... 379/216; 379/201; 379/207
(58) Field of Search .................................. 379/355, 233, 379/231, 232, 265, 207

(56) References Cited

U.S. PATENT DOCUMENTS

| | | |
|---|---|---|
| 3,920,902 | 11/1975 | Matsuo et al. . |
| 4,696,028 | 9/1987 | Morganstein et al. . |
| 4,899,373 * | 2/1990 | Lee et al. .................. 379/216 X |
| 4,975,941 | 12/1990 | Morganstein et al. . |
| 5,303,298 | 4/1994 | Morganstein et al. . |
| 5,452,347 * | 9/1995 | Igelhardt et al. ................. 379/201 X |
| 5,473,672 * | 12/1995 | Khalid .............................. 379/234 X |

FOREIGN PATENT DOCUMENTS

| | | |
|---|---|---|
| 2 198 011 | 6/1988 | (GB) . |
| 59-188264 | 10/1984 | (JP) . |
| 60-100863 | 6/1985 | (JP) . |
| 61-121637 | 6/1986 | (JP) . |
| 63-151156 | 6/1988 | (JP) . |
| 3-52444 | 3/1991 | (JP) . |
| 7-264307 | 10/1995 | (JP) . |

OTHER PUBLICATIONS

Japanese Search Report/Office Action.

* cited by examiner

*Primary Examiner*—Creighton Smith

(57) ABSTRACT

A method facilitates providing private exchange functionality to a subscriber that is remote from the private network. In the private network, telephones connected thereto can be accessed via extension dialing. The remote subscriber can dial the extension of a second telephone connected to said private network. A local exchange receives the extension and translates it into a phone number for the second telephone. The local exchange then uses the phone number to establish a connection between the subscriber and the second telephone. The same method can be used to implement remote speed dialing and automatic callback through the private network.

18 Claims, 2 Drawing Sheets

METHOD FOR PROVIDING REMOTE EMULATION OF THE FUNCTIONALITY OF A PRIVATE EXCHANGE

BACKGROUND OF THE INVENTION

The present invention is directed to a method for providing a private exchange functionality to a remote terminal. More specifically, the invention is directed to a method which provides remote emulation of the functionality of a private branch exchange including such features as: extension dialing, speed dialing, and auto dial back.

The popularity of the home office and "telecommuting" in the work force has created new opportunities for the communication industry. Individuals working from home now demand the same telecommunication features and options available to them at the workplace. To service that growing market, communications companies are now providing the same office support services found in many of today's larger corporations. For example, ISDN access lines, video and telephone conferencing, and high speed modem access are now but a few of the features now available in the home office.

At present, if a worker at home wishes to contact a co-worker at the workplace, he must have the actual telephone number of the worker or must have the main PBX access number and the extension of the worker to be able to place a call to the worker at the workplace. Furthermore, the at-home worker does not get any of the other benefits of the PBX, namely speed dialing or automatic dial back which are functions which may be available to the worker at their workstation at the workplace. It is desirable to provide a method by which the home worker can have access to PBX functionalities such as extension dialing even when they are remote from the workplace private exchange that provides such functionality.

SUMMARY OF THE INVENTION

The present invention provides a method by which a first telephone can access functionality available at a telephone switch remote from the first telephone. For instance, the invention provides that a home worker using a first telephone can have functionality that is also available at a private branch exchange remote from the first telephone. The functionality can include the extension dialing of a second telephone that is coupled to the private branch exchange. In accordance with the present invention, access to such functionality is achieved by providing a database in association with the local exchange to which the homeworker is coupled or connected. That database stores information to translate functionality requests into actual telephone numbers to be dialed. The local office then initiates calls using the actual telephone numbers and establishes connections between the at-home or remote caller and the desired telephone that is coupled to the private branch exchange.

In accordance with the present invention, in addition to extension dialing, the remote caller may have access to such functions as speed dialing or automatic call back dialing.

DETAILED DESCRIPTION

Figure 1:
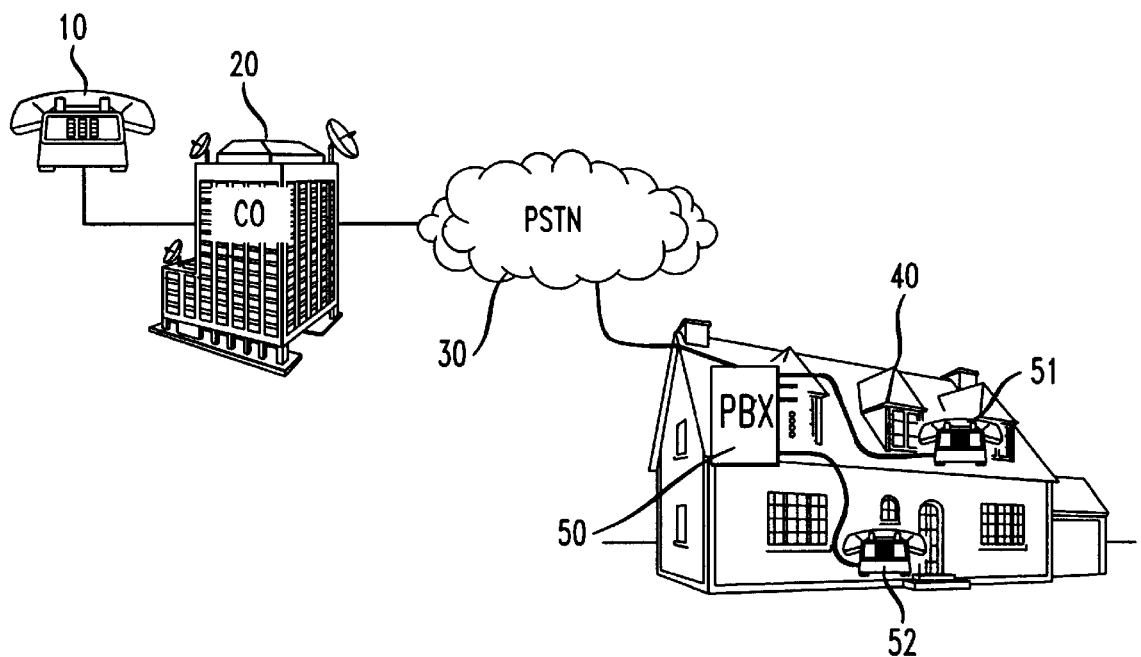
FIG. 1 illustrates a known telecommunications configuration.

FIG. 1 illustrates a known communication arrangement for providing communication service to a telecommuting worker. The worker, at home, has access to telephone station 10. That telephone station is coupled to a central office 20. The worker's workplace is designated as element 40 which is remote from the worker and remote from telephone station 10. The central office 10 and the workplace 40 are coupled via the Public Switched Telephone Network (PSTN) 30. Please note that central office 20 would be considered part of the public switched telephone network PSTN but is shown separately for purposes of providing an indication of what the home worker telephone is most directly coupled to and to aid in the description of the invention that follows with respect to FIG. 2. A private branch exchange (PBX) provides telecommunication service within the work environment. The PBX provides switching between various telephone stations, for example 51 and 52, within the workplace. The PBX can provide such functionality as extension dialing, speed dialing, and auto dial back.

In extension dialing, a user at telephone station 51 need only dial an extension number for telephone station 52 and the PBX will establish a connection between the two stations. Speed dialing, which is also known, operates by permitting the user of a telephone station, for example 51, to input a reduced number of keypad entries to execute the dialing of a desired party. As one example, the telephone station may have a single key set aside for speed dialing which permits the user to program the key and then when the key is pressed then the desired number is used to establish a connection to the desired party. In the auto dial back function, the PBX keeps track of the number of the calling party who last attempted to contact a given station. When that given called station so desires, it can request an automatic callback to the party that previously called. The PBX uses the stored calling party information to establish a communications path to the previous calling party.

In the known telecommunications arrangement, the worker, when she is remote from the PBX, that is when she is telecommuting or at home, does not have access to these features of PBX 50.

Figure 2:
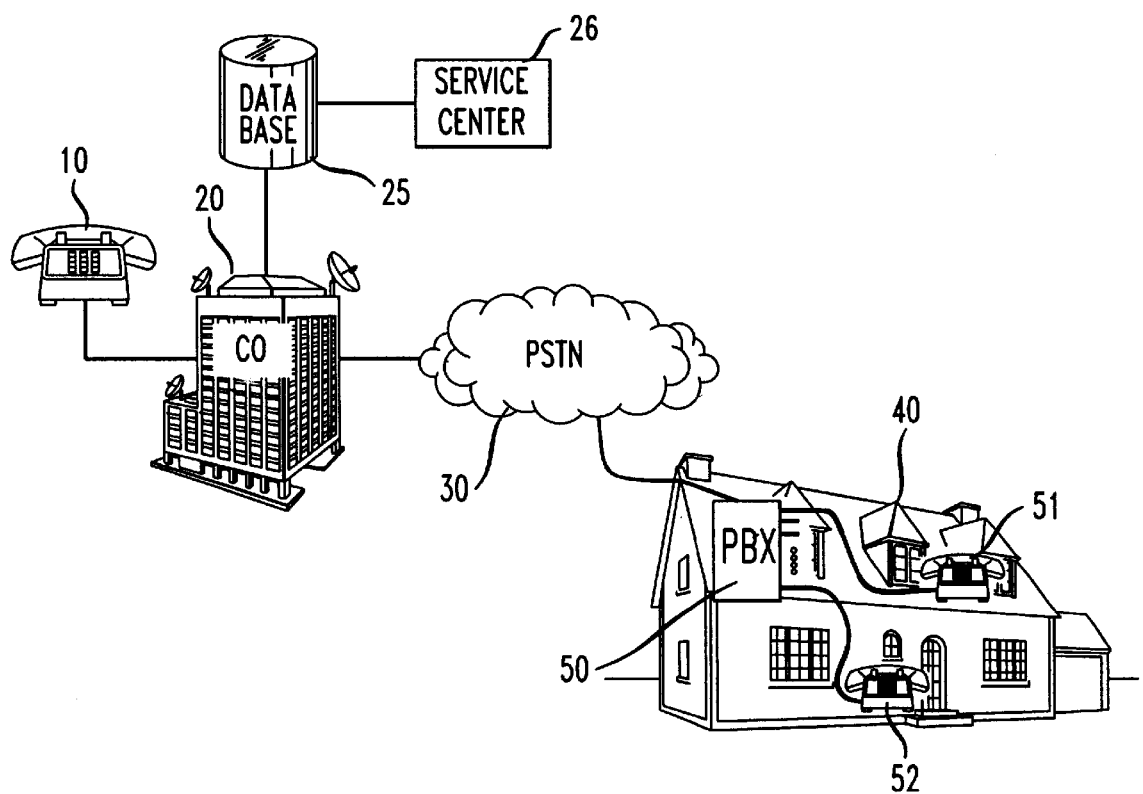
FIG. 2 illustrates a telecommunications system in accordance with an embodiment of the present invention.

In accordance with an embodiment of the present invention, the worker using telephone station 10 obtains access to the functionality which they would be able to have if they were instead located in the workplace environment connected to the PBX. With reference to FIG. 2, like elements in FIGS. 1 and 2 bear like reference numerals. One new element illustrated in FIG. 2 is database 25. Furthermore, a connection between the central office 20 and the database 25 is added. This database allows the central office to provide functionality to the worker to emulate being at the location of the PBX. In particular, the database 25 can store real telephone numbers for establishing connections to parties at the PBX 50 in accordance with a functionality that may be desired.

For example, if the home worker desires to have extension dialing capabilities, that is she wishes merely to dial the extension of a co-worker, for example a worker at station 52, then the following operations may be performed in connection with the database 25. First, the home worker would need to provide programming information to the database. Such information would include the desire to implement extension dialing, extension numbers and corresponding real telephone numbers, the desire to implement speed dialing, a speed dialing code or identifier and a corresponding real telephone number, and an automatic dial back functionality.

This data can be provided to the database during a registration call via the CO or it may be entered into the database by a service center 26 in response to the customer providing all of the necessary data to the service center in a separate call or data transmission (for example, a completed application form or other data message such as by facsimile or Internet access). If the information is provided to the database during a direct call from the home worker, it is also possible that the process can be controlled by an integrated voice response (IVR) system. In such a system the caller may be provided with voice prompts and/or voice menu options. The caller can then enter data either using the keypad or with a voice response.

Regardless of how the data is entered into the database, the data essentially constitutes a table of information associated with the home worker correlating actual telephone numbers for contacting parties coupled to PBX 50, and dialing commands or reduced length telephone numbers (e.g., extensions) usable at the workplace to contact such parties.

Once the database associated with the central office has been established, the operation or call process flow is rather straightforward. In particular, once the home worker at telephone station 10 desires to extension dial a co-worker at PBX 50, the home worker goes off-hook and receives a dial tone from central office 20. The worker then can enter a short sequence of numbers and/or symbols to indicate that an extension number is to be dialed. Then the home worker enters the extension number and some terminating symbols such as the * or # key. The central office detects the dialed extension and initiates a query to a database 25. The database could be operated by the local exchange carrier that operates the central office. Alternatively the database could be operated by another party (such as an inter exchange carrier) that sells, for example, enhanced network services. The query does two things. First, it verifies the calling subscriber. This can be done using the automatic number identification (ANI) associated with the subscriber telephone station. Then, once the subscriber has been verified the received extension number, for example 825, is used to conduct a look up or translation function using the subscriber database. The extension number is compared to the list of extension numbers for which the subscriber has provided real telephone number information. When a match is found, the real telephone number which may correspond to a Direct Inward Dial number for station 52 is returned from the database to the local exchange carrier central office. The central office then dials the real telephone number for telephone station 52 and establishes a communications path between telephone station 10 and station 52 which path passes through PBX 50. In this manner, the home worker has a virtual attachment to the PBX for purposes of obtaining certain functionality. While the functionality is in fact provided by the database and central office operating together, the functionality emulates the functionality that would be available to the worker if they were at the workplace rather than at home.

Figure 3:
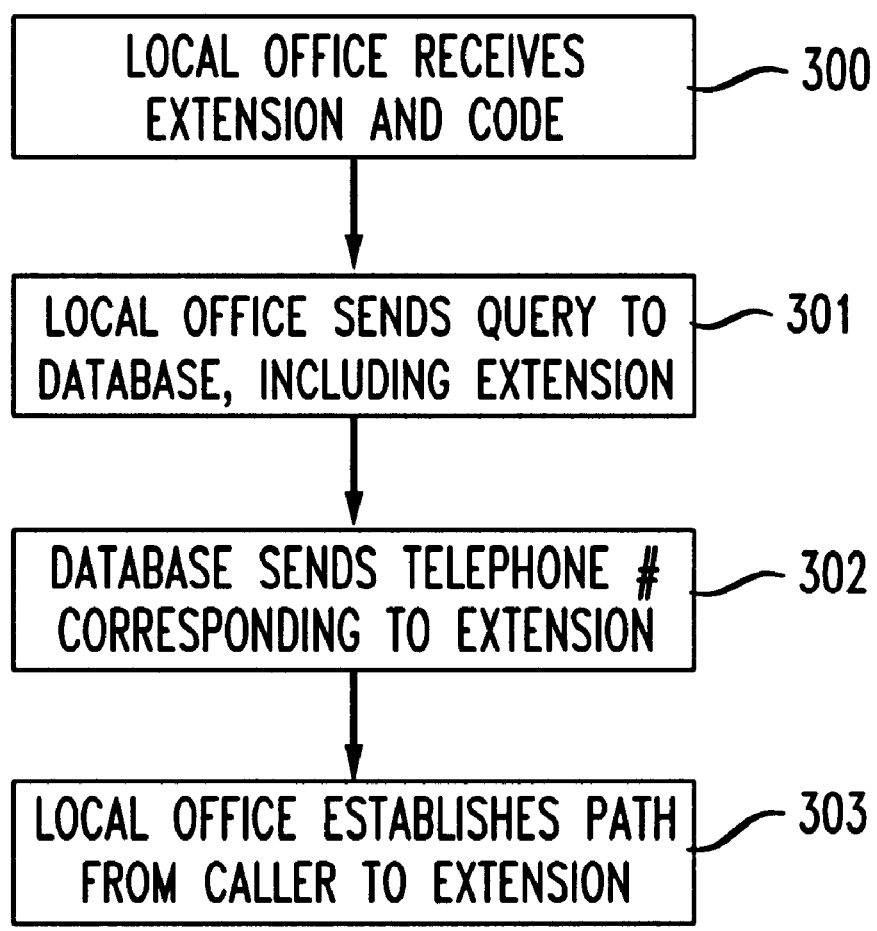
FIG. 3 illustrates a call processing flow in accordance with an embodiment of the present invention.

The above described processing operation is illustrated in a flow diagram in FIG. 3. In accordance with the process, a local office receives the extension plus some code designated that extension dialing is desired in step 300. The local office sends a query to the database including the extension in step 301. The database sends the real telephone number corresponding to the extension back to the local office in step 302 and the local office establishes a path from the caller to the extension in step 303.

The call processing could be modified depending on whether the caller actually seeks to implement a different functionality. For example, the caller may desire to implement the speed dialing functionality. In this circumstance, the caller may have programmed in the subscriber database a particular speed dial code which will access a particular telephone number for dialing. For instance, after the subscriber goes off-hook they may enter a code such as *XX that indicates a speed dial selection is to follow. The user can then enter a single digit identifying one of possible ten speed dial numbers. If the user activates speed dial "1" for example, then the local office sends a query to the database looking for the actual telephone number associated with that speed dial code. Once the number is retrieved from the database then the local exchange can establish a path from the caller to the party corresponding to the speed dial number.

In the embodiments described above with reference to FIG. 2, the telephone 10 is shown coupled to central office 20. That coupling can be via a typical land-line connection. Alternatively, the subscriber's telephone may constitute a wireless communication unit. Such a unit could make use of a database coupled to the central office by the routing of calls from the wireless network to the CO which, as described above, is part of the PSTN. In a further variation the database 25 and service center may be provided in the wireless network to service a wireless subscriber.

The present invention provides a remote subscriber with functionality that emulates the functionality available at a private exchange. As a consequence, a worker at home can have access to functionality they would have if they were in fact in the workplace and using a telephone station connected to the private branch exchange at the workplace. The database coupled to the central office provides tremendous flexibility in terms of designating real telephone numbers that are of interest to the subscriber and can be accessed with special codes which are shorter in length than having to dial the entire telephone number. Thus, the combined operation of the central office and the database provide an emulation of PBX functionality to the remote subscriber who is working at home.

What is claimed is:

1. A method of providing to a first telephone, access to functionality available at a telephone switch remote from said first telephone, comprising the steps of:

receiving at a local exchange a request for service from the first telephone, the request including a first code representing a type of service and a second code;

responsive to the first code, querying a remote database with the second code;

receiving a query response that includes a telephone number; and originating a call from said local exchange to said telephone number.

2. The method of claim 1 wherein said request for service includes an extension associated with a second telephone.

3. The method of claim 1 wherein the first code is a code requesting speed dialing and the second code is a speed dial number corresponding to a second telephone.

4. The method of claim 1 wherein said telephone number comprises a direct inward dial number.

5. A method for enabling a first telecommunications terminal to access a second telecommunications terminal associated with first switching equipment that provides access via extension dialing, the method comprising the steps of:

at a local exchange, receiving an extension number of the second telecommunications terminal from the first telecommunications terminal;

querying a remote database with the extension number;

receiving in response to the query a telephone number for accessing said second telecommunications terminal; and establishing a communication path between said first telecommunications terminal and said second telecommunications terminal via said local exchange using said telephone number obtained in said receiving step.

6. The method of claim 5 wherein said telephone number comprises a direct inward dial number.

7. The method of claim 5 wherein said step of establishing comprises the substeps of originating a call to said second telecommunications terminal from said local exchange with said telephone number for accessing;

and connecting said first telecommunications terminal to a communications path that services said call said second telecommunications terminal.

8. The method of claim 5 wherein said step of establishing comprises the substeps of originating a call to said second telecommunications terminal from said local exchange with said telephone number for accessing;

and connecting said first telecommunications terminal to a communications path that services said call said second telecommunications terminal.

9. A method for emulating establishment of coupling of two stations on a private exchange such that a remote station can appear to be coupled to a station associated with the private exchange, the method comprising the steps of:

at a local exchange, receiving from the remote station an extension number corresponding to a station at said private exchange;

querying a remote database with the extension number;

receiving in response to the query a telephone number for accessing said station at the private exchange; and using said telephone number to establish a communication path between aid remote station and said station at the private exchange via said local exchange and said private exchange.

10. The method of claim 9 wherein said telephone number comprises a direct inward dial number.

11. The method of claim 9 wherein said step of establishing comprises the substeps of originating a call to said second telecommunications terminal from said local exchange with said telephone number for accessing;

and connecting said first telecommunications terminal to a communications path that services said second telecommunications terminal.

12. The method of claim 9 wherein said step of establishing comprises the substeps of originating a call to said second telecommunications terminal from said local exchange with said telephone number for accessing; and connecting said first telecommunications terminal to a communications path that services said call said second telecommunications terminal.

13. A system for providing functionality available at a telephone switch to a first telephone that is remote from the telephone switch, the system comprising:

a local exchange that receives a service request from the first telephone; and a remote database, in communication with said local exchange wherein said local exchange utilizes a telephone number of a second telephone coupled to said telephone switch read directly from said remote database in communication with said local exchange in response to said service request to establish a communication between said first telephone and said second telephone.

14. A system for enabling a first telecommunications terminal to access a second telecommunications terminal associated with first switching equipment that provides access via extension dialing, the system comprising:

a local exchange receiving an extension number of the second telecommunications terminal from the first telecommunications terminal; and a remote number translator, capable of identifying a single phone number in response to a request for an extension number, coupled to said local exchange, that translates said extension number into a telephone number for accessing said second telecommunications terminal;

wherein, using said telephone number said local exchange establishes a communications path between said first telecommunications terminal and said second telecommunications terminal.

15. A method for providing functional emulation of a private exchange at a remote telephone comprising:

receiving, at a local exchange, a request for service from a first telephone, the request including a first code representing a private exchange function and a second code;

responsive to the first code, querying a remote database with the second code;

receiving a query response from said remote database containing a private exchange function; and, performing the private exchange function contained in the query response.

16. The method of claim 15 wherein the private exchange function performed includes dialing a number in the private exchange.

17. The method of claim 15 wherein the private exchange function performed is speed dialing.

18. The method of claim 15 wherein the private exchange function performed is auto-dial back.

* * * * *